United States Patent [19]

Otto

[11] Patent Number: 5,722,664
[45] Date of Patent: Mar. 3, 1998

[54] SEAL WITH PUMPING CAPABILITIES

[75] Inventor: Dennis L. Otto, Malvern, Ohio

[73] Assignee: The Timken Company, Canton, Ohio

[21] Appl. No.: 719,723

[22] Filed: Sep. 25, 1996

[51] Int. Cl.$^6$ .................................................. F16J 15/32
[52] U.S. Cl. ........................... 277/35; 277/133; 277/152; 277/153
[58] Field of Search ................................... 277/53, 56, 35, 277/133, 134, 152, 153; 384/480, 484, 485, 486

[56] References Cited

U.S. PATENT DOCUMENTS

| | | |
|---|---|---|
| 2,054,580 | 9/1936 | Delaval-Crow . |
| 2,639,954 | 5/1953 | Potter . |
| 2,819,100 | 1/1958 | Peterson . |
| 2,945,730 | 7/1960 | Murray et al. . |
| 3,021,161 | 2/1962 | Rhoads et al. . |
| 3,101,954 | 8/1963 | Huddle . |
| 3,801,114 | 4/1974 | Bently ............................. 277/134 |
| 4,434,985 | 3/1984 | Sommerat . |
| 4,458,957 | 7/1984 | Greener .............................. 277/53 |
| 4,669,895 | 6/1987 | Colanzi et al. .................. 384/486 |
| 4,699,526 | 10/1987 | Sato ................................. 277/153 |
| 4,770,424 | 9/1988 | Otto ................................. 277/134 |
| 4,770,548 | 9/1988 | Otto ................................. 277/134 |
| 4,799,808 | 1/1989 | Otto ................................... 277/95 |
| 4,863,292 | 9/1989 | Dreschmann et al. ........... 384/484 |
| 4,991,982 | 2/1991 | Colanzi et al. .................. 384/484 |
| 5,022,659 | 6/1991 | Otto . |
| 5,129,744 | 7/1992 | Otto et al. . |
| 5,201,533 | 4/1993 | Lederman ........................ 384/484 |
| 5,207,436 | 5/1993 | Lederman . |
| 5,419,642 | 5/1995 | McLarty .......................... 384/486 |
| 5,458,420 | 10/1995 | Otto . |

*Primary Examiner*—Scott Cummings
*Attorney, Agent, or Firm*—Polster, Lieder, Woodruff & Lucchesi, L.C.

[57] ABSTRACT

A seal suitable for closing the annular space between the races of an antifriction bearing includes a case which fits into the outer race and a shield that fits over the inner race. Both the case and shield have axial and radial walls that enclose a cavity within the seal. The seal also includes an elastomeric seal element which is bonded to the radial wall of the case and includes a lip which extends obliquely into the cavity and toward the axial wall of the case which it contacts to create a dynamic barrier. The shield also has an outer radial wall that encircles the inner radial wall and extends along the axial wall of the case such that a small gap exists between the outer axial wall of the shield and the axial wall of the case. The outer axial wall of the shield is either out of round or eccentric with respect to the inner axial wall, so that the size of gap varies circumferentially along the gap. As a consequence of this variance, the seal will pump fluent contaminants, such as water. Under static conditions the fluent contaminants drain from the cavity through the gap.

21 Claims, 2 Drawing Sheets

SEAL WITH PUMPING CAPABILITIES

BACKGROUND OF THE INVENTION

This invention relates in general to seals and more particularly to a seal with pumping capabilities.

Automotive wheel bearings and the seals which protect them have diminished in size over the years. Better steels have made smaller bearings possible, whereas improved seal designs reduced the size of the seals. The smaller bearings and seals left room for additional components, such as rotors and sensors for antilock braking systems and constant velocity joints. Installing the seals in the bearings themselves instead of in the hubs or housings that contain the bearings produced a further reduction in size. This practice contributed to the wide-spread use of unitary or package bearings.

One particularly effective seal that sees use in the wheel bearings of automobiles and light trucks employs two cases, each having a seal element bonded to it, with each seal element contacting an axially directed surface on the other case. The outer case is pressed into a bore at the end of the outer race for the bearing, whereas the inner case, which is often referred to as a shield, is forced over the inner race. That two-element seal forms the subject of U.S. Pat. No. 5,022,659.

But the cost of bonding an elastomeric seal element to each case of a two element seal makes the seal more expensive than the traditional single element seals. Moreover, the torque required to overcome friction within a two-element seal generally exceeds that required for a single element seal of equivalent size. Sometimes the seal element remote from the bearing interior, which is the one exposed to the contaminants, does not receive enough lubrication. This diminishes the effectiveness of the fluid barrier established by the seal element, and water may enter the cavity that exists between the two seal elements. If that seal element regains its capacity to effectively seal, perhaps by a purge of grease from the bearing, the water can become trapped in the cavity and may enter the interior of the bearing.

Seal manufacturers make every effort to keep the axially directed walls of two-element seals concentric and free from runout and eccentricity. After all, the cylindrical sealing surfaces of a two-element seal exist along the axial walls, and should eccentricity or a deviation from round exist at these surfaces, a void could well develop between the seal element and the cylindrical surface which it contacts. With the void comes a breakdown in sealing integrity and a compromise of the lubricant barrier, which in turn may allow the entry of contaminants or the loss of lubricant or both. Typically, the problem resides in the inner case or shield. In this regard, the outer case fits into a ground bore in the outer race of the bearing, and the grinding leaves that bore truly cylindrical for all intent and purposes. Actually, the axial wall of the outer case along which the cylindrical sealing surface exists is pressed into the bore, and by reason of the press fit, that surface assumes the truly cylindrical character of the bore. The same holds true with regard to the inner case. Its axial wall fits over a ground surface on the inner race with an interference fit and hence assumes the character of that ground surface. But the remaining walls of the inner race—walls to which the seal element is bonded—may possess some eccentricity or may be out-of-round. As a consequence, the size of the gap between the extremities of the inner case and the axial wall of the outer case may vary—sometimes more than the seal element of the inner case can accommodate.

Sometimes the outer races are furnished without grinding the bores at the ends of them. Heat treatments may leave those bores somewhat out-of-round, and the deviations from round will likewise appear in the axial wall of the outer race, owing to the press fit, and also in the cylindrical sealing surface on that wall. This makes an elastomeric seal element less effective against that cylindrical surface. Generally, bearing manufacturers will not use a two-element seal where the bore in the outer race is not ground.

The present invention resides in a seal having a case and a shield which enclose a cavity, but the seal has only a single elastomeric seal element which is bonded to the case and includes a lip that extends into the cavity where it establishes a dynamic lubricant barrier along the shield. Yet the seal is nearly as effective as a two-element seal. In lieu of a second elastomeric seal element, the seal case and shield have closely spaced walls which are directed axially, with one of the walls being eccentric or out-of-round, so that the gap between the two walls is not uniform. As the one axial wall rotates relative to the other, the varying gap induces a pumping action, and this has the effect of pumping fluent contaminants, such as water, both into and away from the cavity that is enclosed by the case and shield. That which enters the cavity exists at a slightly elevated pressure, owing to the pumping action, and forces the elastomeric seal lip with greater force against the shield, thus enhancing the barrier established by the lip. Since the slightly elevated pressure is resisted by the elastomeric seal lip operating within the cavity, the slightly elevated pressure is relieved by expelling the fluent contaminants from the cavity through the gap between the two radially spaced axial walls. Since these two walls establish a varying gap, the gap cannot become clogged with solid contaminants to prevent the fluent contaminants from being expelled from the cavity during dynamic operations. The gap, which is maintained in the presence of solid contaminants, can provide a drain for the fluent contaminants to escape from the cavity under static conditions after dynamic operation is terminated.

The invention also consists in the parts and in the arrangements and combinations of parts hereinafter described and claimed.

DESCRIPTION OF THE DRAWINGS

In the accompanying drawings which form part of the specification and wherein like numerals and letters refer to like parts wherever they occur.

DETAILED DESCRIPTION

Figure 1:
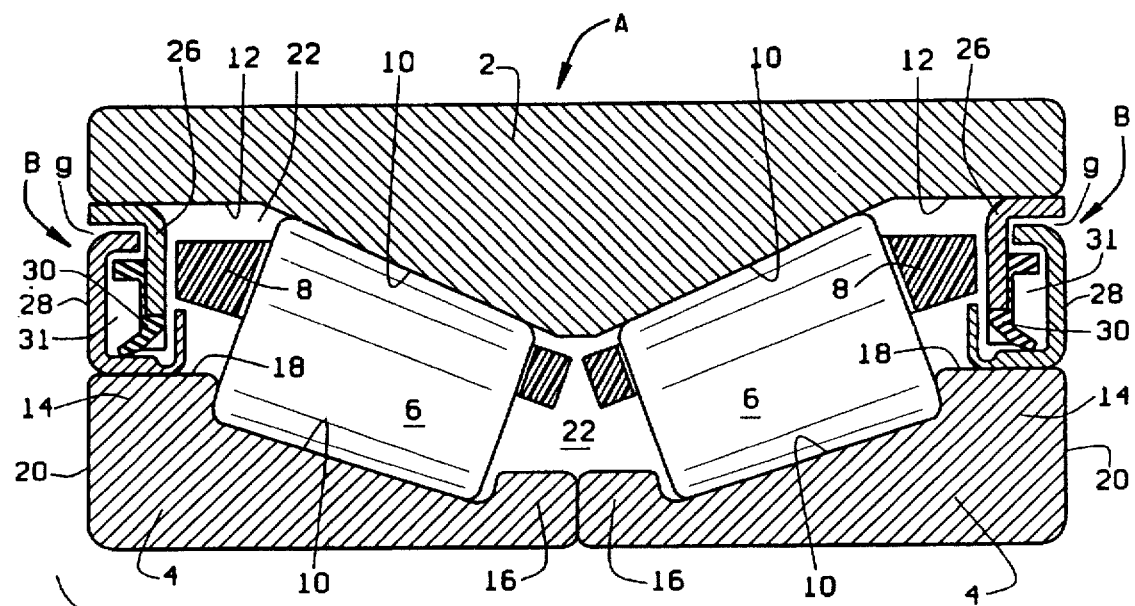
FIG. 1 is a sectional view of a bearing fitted with a seal constructed in accordance with and embodying the present invention.

Referring now to the drawings, a double row antifriction bearing A (FIG. 1) at each of its ends is closed by a seal B, thus confining a lubricant, which is normally grease, to the interior of the bearing A, and excluding contaminants, such as water and dust, from that interior. The bearing A resides between two machine components and enables one of those components to rotate relative to the other about an axis X with minimum frictional resistance. Actually, the seal B may fit between and close an annular space that exists between any two machine components, one of which rotates relative to the other, but the closure of an antifriction bearing represents the primary utility for the seal B, and in that sense the two machine components may be races of the bearing itself.

The bearing A, which is conventional, includes (FIG. 1) an outer race in the form of a double cup 2, an inner race in the form of two cones 4, and rolling elements in the form of tapered rollers 6 which lie in two rows between the cup 2 and the two cones 4—there being a separate row around each cone 4. In addition, the bearing A has cages 8 which are integrated into the two rows of rollers 6 and serve to maintain the proper spacing between the rollers 6 as well as to retain the rollers 6 around the cones 4 when the cones 4 are withdrawn from the cup 2. The rollers 6 of the two rows contact the cup 2 and the cone 4 along opposed raceways 10, there being two raceways 10 on the cup 2 and a single raceway 10 on each cone 4. Basically, line contact exists between the side faces of the rollers 6 and the raceway 10. Moreover, the raceway 10 of each row—and the side faces of the rollers 6 as well—if extended to their respective apices would have those apices located at a common point along the axis X.

The raceways 10 of the cup 2 taper downwardly toward each other, and hence their smallest diameters lie generally midway between the ends of the cup 2. At their large ends the cup raceways 10 merge into end bores 12 which open out of ends of the cup 2. During manufacture the cup 2 undergoes a heat treatment, and after that heat treatment its raceways 10 are ground to ensure that they exist at the proper angle and that they are truly circular with their common axis being the axis X.

The bores 12 may be ground after the heat treatment as well, and when they are, they have a truly cylindrical configuration and concentric with the raceways 10. However, the cup 2 may be furnished without its end bores 12 ground. While the bores 12 are machined prior to the heat treatment, and are truly cylindrical for all intent and purposes, the heat treatment produces distortions and may leave the bores 12 with lobes or otherwise out-of-round.

Each cone 4, in addition to its raceway 10, has a thrust rib 14 at the large diameter end of its raceway 10 and a retaining rib 16 at the small diameter end. The large ends of the tapered rollers 6 bear against the thrust rib 14, and indeed the thrust rib 14 prevents the rollers 6 from being expelled from the bearing A. In this regard, radial loads transferred through the bearing A translate, at the raceways 10, into small axial components which urge the rollers 6 up the raceways 10. Were it not for the thrust ribs 14 at the ends of the cone raceways 10, the rollers 6 would be expelled from the interior of the bearing A. The thrust rib 14 for each cone 4 has a cylindrical mounting surface 18 that is presented outwardly away from the axis X and ends at a back face 18 which is squared off with respect to the axis X. Like the cup 2, the cone 4 is machined to the desired configuration, then subjected to a heat treatment, and finally ground to give its raceways 10 the proper taper and to ensure that they are truly circular. The mounting surface 18 on the thrust rib 14 of each cone 2 also receives a grind subsequent to the heat treatment to ensure that it is truly cylindrical with its center coinciding with the axis X.

The retaining rib 16 at the small end of the cone raceway 10 cooperates with the cage 8 to hold the rollers 6 around the cone 4—indeed along the cone raceway 10—when the cone 4 is withdrawn from the cup 2. The two cones 4 may abut along the ends of their retaining ribs 16 or a spacer may be interposed between the two cones 4 at their retaining ribs 16. The axial dimensions of the retaining ribs 16, or where a spacer is employed, the length of the spacer, determines the setting for the bearing A.

The raceways 10 of the cup 2 and the cones 4 create an annular space 22 (FIG. 1) within the bearing A, and this space 22 opens out of the ends of the bearing A through the end bores 12 and around the mounting surfaces 18 on the cone thrust ribs 14. In short, the end bores 12 and mounting surfaces 18 lie at and form the ends of the space 22.

The seals B close the ends of the annular space 22 (FIG. 1), and they retain the lubricant for the bearing A in that space 22 and exclude contaminants from it. Actually, the seals B fit into the end bores 12 of the cup 2 and around the thrust ribs 14 of the cones 4, providing live or dynamic barriers in these regions.

Figure 2:
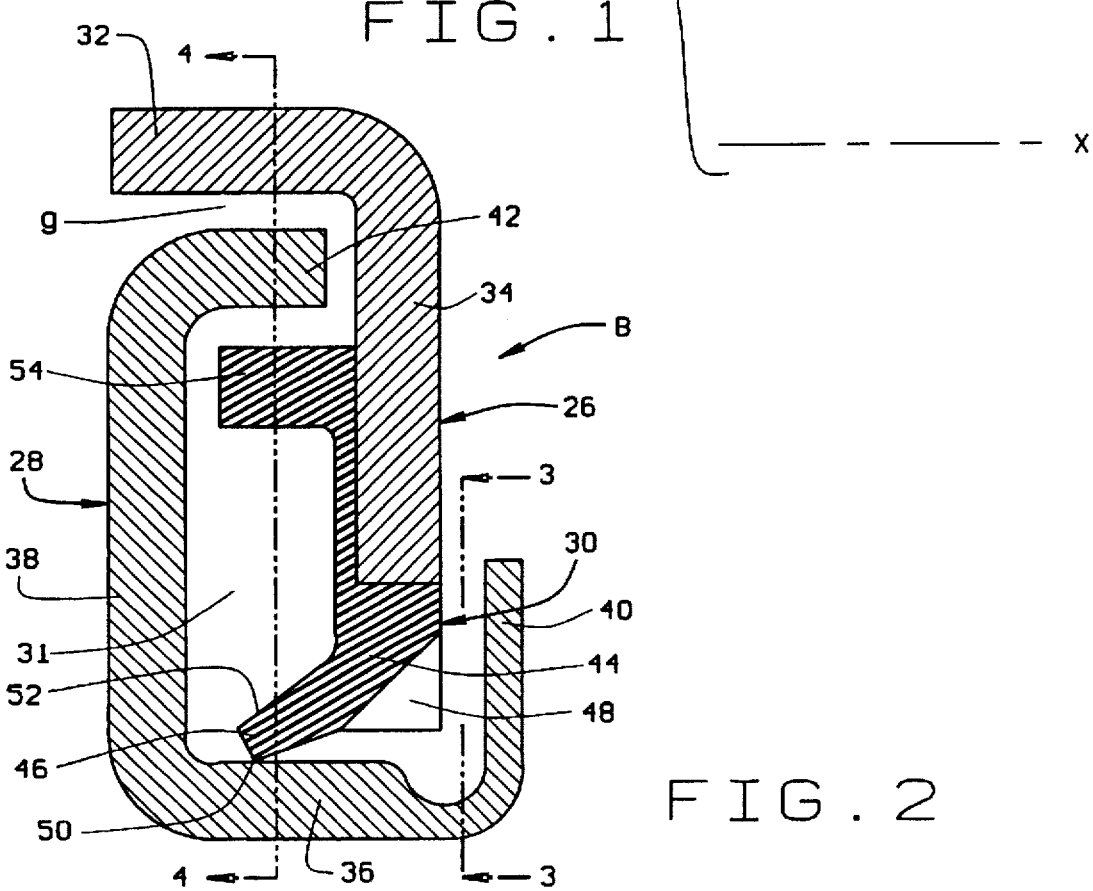
FIG. 2 is an enlarged sectional view of the seal.

Each seal B includes (FIGS. 1 and 2) a case 26 which fits into the end bore 12, at the end of the bearing A closed by the seal B, another case or shield 28 which fits around the cone thrust rib 14 at the same end of the bearing B, and an elastomeric seal element 30 which is bonded to the case 26 and contacts the shield 28, establishing a dynamic barrier along the shield 28. Actually, the seal element 30 lies within an annular cavity 31 that is enclosed by the case 26 and shield 28.

The case 26 includes (FIG. 2) an axial wall 32 which fits within and along the end bore 12 in which the seal B is housed and a radial wall 34 which is directed radially inwardly from the axial wall 32. The diameter of the axial wall 32 slightly exceeds that of the end bore 12, so that an interference fit exists between the case 26 and the cylindrical surface of the end bore 12. Hence, one must press the case 26 into the end bore 12. The radial wall 34, while being directed toward the cone thrust rib 14 which lies within the end bore 12, terminates short of that thrust rib 14, so that a space of moderate size exists between the inner margin of the radial wall 34 and the mounting surface 18 on the thrust rib 14.

That mounting surface 18 serves to position and support the shield 28. Like the case 26, the shield 28 includes (FIG. 2) an axial wall 36 and a radial wall 38. The axial wall 36 lies along the mounting surface 18 of the thrust rib 14, and indeed an interference fit exists between the two. During installation of the seal B in the bearing A, the axial wall 32 of the seal case 26 is pressed over the mounting surface 18 of the cone thrust rib 14. The radial wall 38 projects outwardly from the axial wall 36 toward the axial wall 32 of the case 26 and obscures the radial wall 34 of the case 26. Indeed, the radial wall 38 of the shield 28 forms the exposed end of the seal B and generally lies flush with the end of the cup 2 and the back face 20 of the cone 4. It is separated from the radial wall 34 of the case 26, and the space between the two radial walls 34 and 38 forms the annular cavity 31. At its opposite end the axial wall 36 of the shield 28 merges into a lip 40 which is directed radially outwardly slightly beyond the inner edge of the radial wall 34 on the case 26 so that the case 26 is captured between the ends of the shield 28.

In addition to the axial wall 36, the radial wall 38, and the lip 40, the shield 28 has another axial wall 42 (FIG. 2) which extends from the radial wall 38 at the periphery of the wall 38 such that the axial wall 42 encircles the axial wall 36. The outer wall 42, however, lies within the axial wall 32 of the case 26, there being a slight gap g between the two. It projects toward the radial wall 34 of the case 26, but terminates short of it. The outer axial wall 42 creates a labyrinth with the axial wall 32 of the case 26 and also with the radial wall 34 of the case 26, and that labyrinth serves to exclude contaminants from the cavity 31 located between the case 26 and the shield 28.

Figure 4:
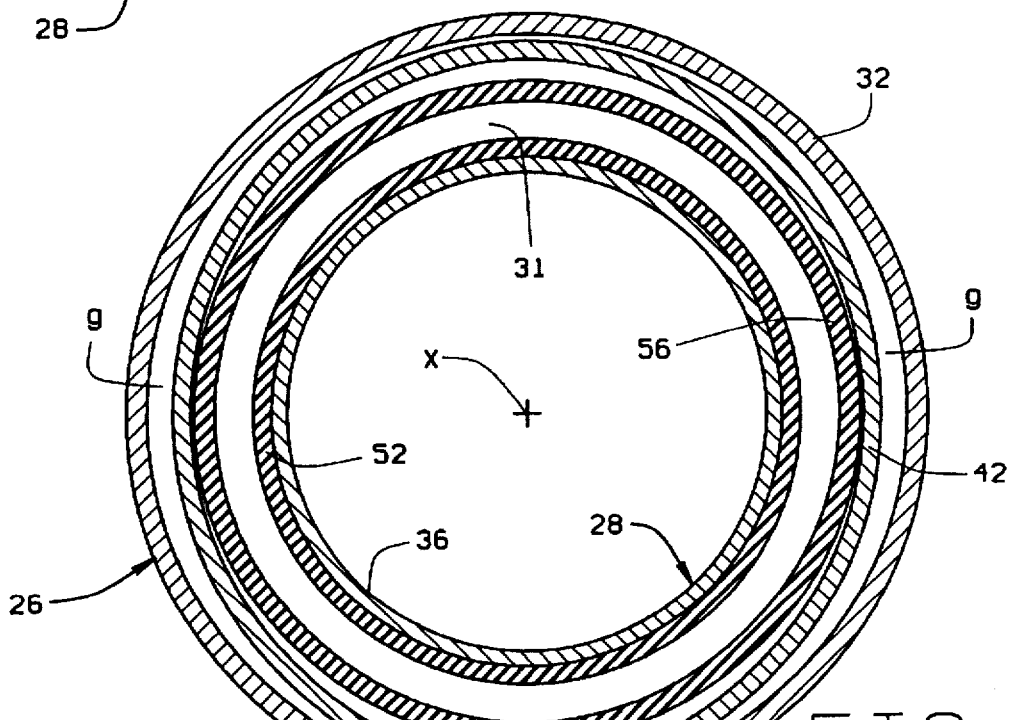
FIG. 4 is a full sectional view of the seal taken along line 4—4 of FIG. 2 and showing the gap that exists within the seal, with the variance in the size of the gap being exaggerated for purposes of illustration.

The gap g between the outer axial wall 42 of the shield 28 and the axial wall 32 of the case 26 is not uniform, but varies circumferentially (FIG. 4). Its minimum dimension should not exceed 0.010 in. and its maximum dimension should be between 0.015 in. and 0.040 in. The variance in the gap g should range between 0.005 in. and 0.040 in. That variance derives from deliberately manufacturing the outer wall 42 of the shield 28 out-of-round with respect to the inner wall 36. For example, the outer wall 42 may be formed somewhat elliptical or it may be provided with lobes in some other manner. The variance may also be derived from making the outer wall 42 eccentric with respect to the inner wall 36, in which event the outer wall has a truly cylindrical configuration. In any event, the deviation in radial distance between the inner axial wall 36, which is concentric with the axis X, and the outer axial wall 42, should range between 0.005 in. and 0.040 in.

The foregoing dimensions assume that very little dynamic runout exists in the bearing A, and this exists in many applications. However, the bearing A may be set with end play, and that may produce considerable runout in the bearing A. Manufacturing tolerances in the bearing A will also contribute to the runout in the bearing A. Indeed, the dynamic runout produced by end play and manufacturing tolerances may be as great as 0.100 in. Of course, the case 26 and shield 28, being mounted respectively on the cup 2 and cone 4 of the bearing A, likewise experience the dynamic runout in the bearing A, and that runout manifests itself in the variance circumferentially in the gap g. The deviation in the radial distance between the inner radial wall 36 and the outer radial wall 42 of the shield 28 should accommodate the dynamic runout. Thus, the maximum deviation in the radial distance between the inner axial wall 36 and the outer axial wall 42 should not exceed the dynamic runout. Generally speaking, where appreciable dynamic runout exists in the bearing A, the minimum size of the gap g must be at least as great as the dynamic runout, whereas the maximum size of the gap g should be 0.040 in. or twice the dynamic runout, whichever is greater.

Figure 3:
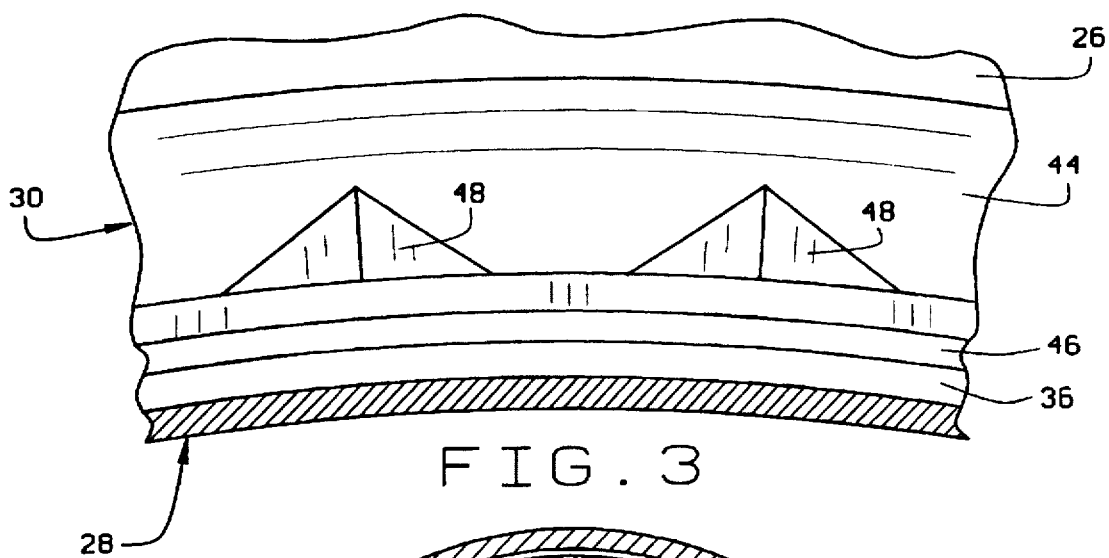
FIG. 3 is a fragmentary sectional view of the seal taken along line 3—3 of FIG. 2.

The elastomeric seal element 30 is bonded to the radial wall 34 of the case 26 and projects inwardly from the case 26 toward the inner axial wall 36 of the shield 28 (FIG. 2). indeed, in this region, the seal element 30 is configured to provide a pumping labyrinth 44 and a contact lip 46. The pumping labyrinth 44 encircles the inner axial wall 36 of the shield 28 near the radial lip 40 of the shield 28, but does not contact the axial wall 36. It forms an edge which projects generally toward the corner formed by the intersection of the inner axial wall 36 and lip 40 of the shield 28 and contains wedge-shaped cavities 48 (FIG. 3) which open toward the axial wall 36 and toward the lip 40 and interrupt the edge. The cavities 48 deflect grease which enters them back toward the rollers 6, and this deflection occurs irrespective of the direction of rotation. Thus, the pumping labyrinth 44 pumps the lubricant for the bearing B back toward the rollers 6 in the annular space 22, and in that sense serves as a lubricant barrier. The seal lip 46 projects away from the pumping labyrinth 44 and lies obliquely with respect to the inner axial wall 36 of the shield 28 which it actually contacts along an edge 50. The seal lip 46 presents a back face 52 to the annular cavity 31 that exists between the case 26 and shield 28.

In addition, the seal element 30 may have a rib 54 which projects from the radial wall 34 of the case 26 toward the radial wall 38 of the shield 28 and hence into the annular cavity 31. Indeed, the rib 54 lies immediately inwardly from the outer axial wall 42 of the shield 28 without contacting that wall and there serves to enhance the labyrinth created between the case 26 and shield 28 in the region of their respective axial walls 32 and 42.

In the operation of the bearing A, the cup 2 rotates around the two cones 4 or the cones 4 rotate within the cup 2, depending on the particular application for which the bearing A is designed. In any event, relative rotation exists between the seal case 26 and the seal element 30, on one hand, and the shield 28, on the other. Some of the lubricant within the annular space 22 encounters the seal B, and at each seal B the pumping labyrinth 44 on the seal element 30 for that seal B directs much of that lubricant back into the annular space 22. Nevertheless, some of the lubricant passes under the labyrinth 44 and along the inner axial wall 36 of the shield 28 and works under the edge 50 of the seal lip 46, thus supporting the edge 50 on the surface of the inner axial wall 36 for the shield 28. This lubrication serves to prevent the contact lip 46 from overheating and hence preserves the lip 46. The seal lip 46 also serves as a barrier to the passage of lubricant along the inner axial wall 36 of the shield 28, although some lubricant escapes past the contact lip 46, even in the absence of elevated pressures within the interior of the bearing A.

Contaminants, on the other hand, approach from the other direction. They encounter the axially directed gap g between the axial wall 32 of the case 26 and the outer axial wall 42 of the shield 28, and it functions as a labyrinth which serves to exclude those contaminants from the annular cavity between the case 26 and shield 28. The axial space between the end of the axial wall 42 of the shield 28 and the rib 54 of the seal element 30 extends and augments the labyrinth, as do the short radial spaces between the end of the axial wall 42 of the shield 28 and the radial wall 34 of the case 26 and between the end of the rib 54 on the seal element 30 and radial wall 38 of the shield 28.

But some water does enter the gap g and, owing to the variance in the width of the gap g, the relative rotation pumps this water in both directions, that is to say, axially out of the seal B and also along the rib 54 and into the annular cavity 31 between the seal case 26 and shield 28. If enough water is present, the cavity 31 fills with it, so that the continued pumping directs all additional water out of the gap g and away from the seal B and further elevates the pressure of the water within the cavity 31. The pressurized water exerts a force on the back face 52 of the contact lip 46, causing its edge 50 to bear with greater force against the inner axial wall of the shield 28. This enhances the barrier established by the lip 46 and prevents the water from defying that barrier and entering the interior of the bearing A. When the bearing A comes to rest, the water formerly contained pressurized within the cavity 31 simply drains from the cavity 31 through the gap g, assuming of course, that the axis X is horizontal. It does not become trapped in the cavity 31.

Not only does the variance in the width of the gap effect pumping, it also prevents the gap g from clogging with solid contaminants. Even though solid contaminants may accumulate on the case 26 and the shield 28 in the region of the gap g, the out-of-round or eccentric character of the outer axial wall 42 on the shield 28 prevents the accumulation of solid contaminants from completely closing the gap g. Thus, water which may migrate into the annular cavity 31 between the case 26 and shield 28 during dynamic conditions can always drain from it during static conditions.

Since the seal B has only one elastomeric molding, that is the elastomeric seal element 30 which is bonded to the case 26, it is less expensive to manufacture than so-called dual element seals.

Figure 5:
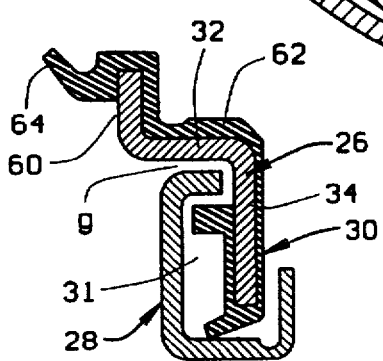
FIG. 5 is a sectional view of a modified seal.

The seal B may modified and thereby assume other configurations. For example the pumping labyrinth 44 may be omitted from the elastomeric seal element 30, leaving only the contact lip 46 to effect a fluid barrier with the inner axial wall 36 of the shield (FIG. 5). Furthermore, the case 26 may also have a flange 60 which is directed radially outwardly from the end of the axial wall 32 on the case 26 to serve as a stop (FIG. 5). As such, the flange 60 limits the distance that the case 26 will advance into the bore 12 at the end of the cup 2 and thus locates the seal B axially within the bore 12.

Rather than having metal-to-metal contact between the case 26 and the surface of the end bore 12 in the cup 2, the axial wall 32 of the case 26 may be reduced in diameter slightly and the elastomeric seal element 30 may be extended over and bonded to it to create an elastomeric mounting section 62 (FIG. 5). When undistorted, the mounting section 62 has a diameter somewhat greater than the diameter of the end bore 12. When the case 26 having the mounting section 62 is inserted into the bore 12, the elastomer of the mounting section 62 compresses and positions the case 26 solidly within the end of the cup 2. If the case 26 has a flange 60, the elastomeric element 30 may be continued along the flange 60, and at the end of the flange 60 it may take the form of another seal lip 64 oriented to establish a yet another barrier along a radial surface (FIG. 5).

Figure 6:
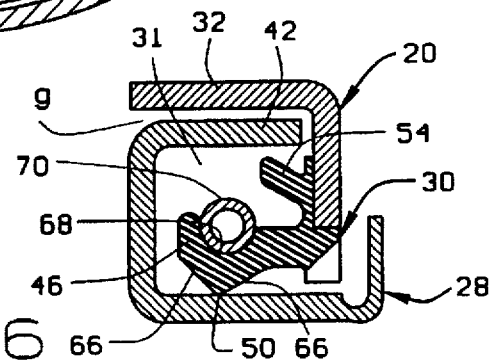
FIG. 6 is a sectional view of another modified seal.

In yet another variation, the axial wall 32 of the case 26 and the axial walls 36 and 42 of the shield 28 are extended to enlarge the cavity 31 within the seal B (FIG. 6). Moreover, the contact lip 46 is reconfigured to extend more axially from the labyrinth 44 and is provided with inwardly presented surfaces 66 which converge to the edge 50 and a groove 68 which is located generally behind the converging surfaces 66 to receive a circumferential spring 70 that urges the lip 46, at the edge 50 formed by the converging surfaces 66, snugly against the inner axial wall 36 of the shield 28. In this variation, the rib 54 of the elastomeric seal element 30 only extends a short distance along the inside of the outer axial wall 42 for the shield 28 and may lie oblique to the axis X.

This invention is intended to cover all changes and modifications of the example of the invention herein chosen for purposes of the disclosure which do not constitute departures from the spirit and scope of the invention.

What is claimed is:

1. In combination with inner and outer machine components, one of which rotates relative to the other about an axis of rotation, with the inner machine component lying within the outer machine component such that an annular space exists between the machine components, a seal for closing the annular space, said seal comprising: a case fitted to one of the components and having an axial wall; a shield fitted to the other machine component and having a first axial wall located along the axial wall of the case such that one of the axial walls lies within the other axial wall with a gap between the two axial walls, the gap extending axially and varying in radial width circumferentially so that fluids that enter it will be pumped generally axially when relative rotation exists between the machine components, the variance in the radial width of the gap being deliberate and at least about 0.005 inches; and an elastomeric seal element attached to the case and establishing a dynamic barrier with respect to the shield.

2. The combination according to claim 1 wherein the shield has a second axial wall, and the seal element includes a lip that contacts the second axial wall of the shield to establish the dynamic barrier.

3. The combination according to claim 2 wherein the case also has a radial wall which is connected to its axial wall; wherein the shield has a radial wall that connects its first and second axial walls and is spaced from the radial wall of the case; wherein the radial walls of the case and shield are separated and an annular cavity exists between them; and wherein the seal element is attached to the radial wall of the case and the lip is exposed to the cavity.

4. The combination according to claim 3 wherein the lip contacts the second axial wall of the shield at a location that is axially offset from the location at which the seal element is attached to the radial wall of the case and has a back face that is exposed to the annular cavity such that an increase in pressure within the annular cavity will urge the lip with greater force against the second axial wall of the shield.

5. The combination according to claim 4 wherein the first axial wall of the shield lies within the axial wall of the case, and the second axial wall of the shield lies within the first axial wall of the shield.

6. The combination according to claim 4 wherein the elastomeric seal element further includes a rib which projects axially from the radial wall of the case and extends generally axially along the first axial wall of the shield, but is spaced from it, to form a labyrinth along the first axial wall of the shield.

7. The combination according to claim 6 wherein the rib of the seal element lies close to and radially inwardly from the first axial wall of the shield.

8. The combination according to claim 4 wherein the elastomeric seal element further contains pumping cavities which are located along the second axial wall of the shield and are configured to pump a lubricant away from the seal when relative rotation exists between the two machine components; and wherein the lip is interposed between the pumping cavities and the gap, with the pumping cavities opening out of one end of the seal and into the annular space between the machine components and the gap opening out of the other end of the seal and away from the annular space.

9. The combination according to claim 1 wherein the outer machine component is the outer race of an antifriction bearing and the inner machine component is the inner race of the bearing; and wherein the bearing further includes rolling elements which occupy the annular space between the machine components.

10. The combination according to claim 1 wherein the radial width of the gap is no greater than 0.040 in. or twice the maximum dynamic runout of the machine components.

11. A seal according to claim 1 wherein the minimum size of the gap does not exceed 0.010 inches.

12. A seal for closing an annular space between two machine components, one of which rotates relative to the other about an axis of rotation, said seal comprising: a case having an axial wall that encircles the axis; a shield having a first axial wall and a second axial wall, both of which encircle the axis, the first axial wall being located opposite and along the axial wall of the case such that a small gap exists between the first axial wall of the shield and the axial wall of the case, the second axial wall of the shield being substantially cylindrical, the first axial wall being configured and located such that the radial distance between it and the second axial wall varies, with the minimum variation in the radial distance between the first and second axial walls being about 0.005 inches, so that the size of the gap is deliberately varied and fluid which enters the gap will be pumped generally axially as relative rotation occurs between the case and the shield; and an elastomeric seal element located between the case and the shield and attached to one of them and configured to establish a dynamic fluid barrier along the other of them.

13. A seal according to claim 12 wherein the variance in the radial distance between the first and second axial walls of the shield ranges between 0.005 and 0.040 inches.

14. A seal according to claim 12 which operates with dynamic runout and the variance in the radial distance between the first and second axial walls of the shield is no greater than two times the dynamic runout.

15. A seal according to claim 12 wherein the shield also includes a radial wall that extends between and connects the first and second axial walls.

16. A seal according to claim 15 wherein the axial walls of the shield are located one within the other.

17. A seal according to claim 16 wherein the case also has a radial wall to which the seal element is attached, the radial wall of the case being spaced axially from the radial wall of the shield such that an annular cavity exists within the seal between the two radial walls, with the cavity at one end being vented through the gap and at its other end being closed by the seal element.

18. A seal according to claim 17 wherein the seal element includes a lip which is oriented at an angle with respect to the radial wall of the case and contacts the second axial wall of the shield, the lip having a back face that is exposed to the annular cavity such that, when fluid within the cavity undergoes an increase in pressure, the lip will bear with greater force against the second axial wall of the shield.

19. A seal according to claim 18 wherein the first axial wall of the shield surrounds the second axial wall of the shield and lies within the axial wall of the case.

20. A seal according to claim 19 wherein the deviation in the radial distance between the first axial wall of the shield and the cylindrical second wall of the shield ranges between 0.005 and 0.040 inches.

21. A seal according to claim 19 which operates with dynamic runout and the variance in the radial distance between the first and second axial walls of the shield is no greater than two times the dynamic runout.

* * * * *